US011872421B2

(12) United States Patent
Desrosier et al.

(10) Patent No.: US 11,872,421 B2
(45) **Date of Patent: *Jan. 16, 2024**

(54) FIRE PROTECTION SYSTEM FOR SLOPED COMBUSTIBLE CONCEALED SPACES HAVING HIPS

(71) Applicant: Victaulic Company, Easton, PA (US)

(72) Inventors: John Desrosier, Plymouth, MA (US); Kevin Desmond Maughan, North Kingstown, RI (US); Stephen J. Meyer, Chester Springs, PA (US); Thomas Edwin Archibald, Saunderstown, RI (US)

(73) Assignee: VICTAULIC COMPANY, Easton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,877

(22) Filed: Nov. 7, 2022

(65) Prior Publication Data

US 2023/0063620 A1 Mar. 2, 2023

Related U.S. Application Data

(63) Continuation of application No. 17/616,863, filed as application No. PCT/US2020/036115 on Jun. 4, 2020, now Pat. No. 11,517,777.

(Continued)

(51) Int. Cl.
*A62C 3/00* (2006.01)
*A62C 35/68* (2006.01)

(52) U.S. Cl.
CPC ................ *A62C 3/00* (2013.01); *A62C 35/68* (2013.01)

(58) Field of Classification Search
CPC ............ A62C 3/00; A62C 35/58; A62C 35/68
See application file for complete search history.

(56) References Cited

U.S. PATENT DOCUMENTS 1,667,425 A 4/1928 Loepsinger
1,796,159 A 3/1931 Pallady (Continued)

FOREIGN PATENT DOCUMENTS

DE 1899279 U 8/1964
DE 112006002211 T5 7/2008

(Continued)

OTHER PUBLICATIONS

Int'l Search Report and Written Opinion dated Aug. 12, 2020 in Int'l Application No. PCT/US2020/036115.

(Continued)

*Primary Examiner* — Darren W Gorman
(74) *Attorney, Agent, or Firm* — Panitch Schwarze Belisario & Nadel LLC

(57) ABSTRACT

A fire protection system is provided for a space having a roof including a pitched portion and at least one end portion having a hip, sloping downward from an apex substantially coinciding with an end of the pitched portion toward an eave and extending outward toward the ends of the sides of the pitched portion. The hip may have a lower hip, including jack trusses, and an upper hip, including stepdown trusses. Within the upper hip, at least two rows of sprinklers may be placed, with a first row of sprinklers located substantially at the apex. The maximum allowable spacing between sprinklers in a direction perpendicular to the slope of the hip may be greater than a maximum allowable spacing between rows of sprinklers, i.e., in a direction parallel to the slope of the hip.

8 Claims, 6 Drawing Sheets

Related U.S. Application Data

(60) Provisional application No. 62/858,427, filed on Jun. 7, 2019.

(56) References Cited

U.S. PATENT DOCUMENTS

| | | | |
|---|---|---|---|
| 2,684,121 | A | 7/1954 | Lim |
| 3,454,097 | A | 7/1969 | Groos |
| 3,833,062 | A | 9/1974 | Livingston |
| 3,834,462 | A | 9/1974 | Orloff et al. |
| 4,091,876 | A | 5/1978 | Valdatta |
| 4,279,309 | A | 7/1981 | Fischer et al. |
| 4,296,816 | A | 10/1981 | Fischer |
| 4,351,393 | A | 9/1982 | Tyree |
| 4,624,414 | A | 11/1986 | Ferrazza |
| 4,800,961 | A | 1/1989 | Klein |
| 5,020,601 | A | 6/1991 | Retzloff et al. |
| 5,097,906 | A | 3/1992 | Polan |
| 5,669,449 | A | 9/1997 | Polan et al. |
| 5,829,532 | A | 11/1998 | Meyer et al. |
| 6,098,718 | A | 8/2000 | Sato |
| 6,336,509 | B1 | 1/2002 | Polan et al. |
| 6,540,261 | B1 | 4/2003 | Painter et al. |
| 6,637,518 | B1 | 10/2003 | Hillier et al. |
| 6,889,774 | B2 | 5/2005 | Multer et al. |
| 7,137,455 | B2 | 11/2006 | Green |
| 7,290,618 | B2 | 11/2007 | Thomas et al. |
| 7,611,077 | B2 | 11/2009 | Sesser et al. |
| 7,757,967 | B1 | 7/2010 | Yang |
| 7,841,418 | B2 | 11/2010 | Pahila et al. |
| 7,909,111 | B1 | 3/2011 | Hinojosa et al. |
| 8,083,002 | B1 | 12/2011 | Golinveaux et al. |
| 8,474,545 | B2 | 7/2013 | Takeuchi |
| 8,544,556 | B2 | 10/2013 | Sundholm et al. |
| 8,602,118 | B2 | 12/2013 | Pigeon |
| 8,733,461 | B2 | 5/2014 | Pigeon |
| 8,800,673 | B2 | 8/2014 | Multer et al. |
| 9,278,239 | B2 | 3/2016 | Pigeon |
| 9,302,132 | B2 | 4/2016 | Green et al. |
| 9,339,675 | B2 | 5/2016 | Koiwa |
| 9,381,386 | B2 | 7/2016 | Pigeon |
| 9,675,827 | B2 | 6/2017 | Pigeon |
| 9,849,321 | B2 | 12/2017 | Huotari et al. |
| 9,868,005 | B2 | 1/2018 | Green et al. |
| 9,956,443 | B1 | 5/2018 | Cutting |
| 10,035,030 | B2 | 7/2018 | Pigeon |
| 10,149,992 | B2 | 12/2018 | Pigeon |
| 10,940,350 | B2 | 3/2021 | Pigeon |
| 2005/0045739 | A1 | 3/2005 | Multer |
| 2006/0021761 | A1 | 2/2006 | Golinveaux |
| 2007/0256844 | A1 | 11/2007 | Blasing et al. |
| 2008/0202773 | A1 | 8/2008 | Pigeon |
| 2009/0218109 | A1 | 9/2009 | Sato |
| 2011/0024138 | A1 | 2/2011 | Multer et al. |
| 2015/0265865 | A1 | 9/2015 | Pigeon |
| 2016/0023031 | A1 | 1/2016 | Thomas |
| 2016/0375287 | A1 | 12/2016 | Meyer |
| 2016/0375288 | A1 | 12/2016 | Pigeon |
| 2017/0165511 | A1 | 6/2017 | Meyer et al. |
| 2017/0259095 | A1 | 9/2017 | Pigeon |
| 2018/0256929 | A1 | 9/2018 | Williams et al. |
| 2019/0099630 | A1 | 4/2019 | Pigeon |

FOREIGN PATENT DOCUMENTS

| | | | |
|---|---|---|---|
| GB | 532837 | A | 1/1941 |
| WO | 2009108944 | A2 | 9/2009 |
| WO | 2013148429 | A2 | 10/2013 |
| WO | 2017075070 | A1 | 5/2017 |

OTHER PUBLICATIONS

Int'l Preliminary Report on Patentabiliy dated Dec. 16, 2021 in Int'l Application No. PCT/US2020/036115.

Int'l Search Report and Written Opinion dated Apr. 15, 2019 in Int'l Application No. PCT/US2019/017028.

Models BB, SD, HIP, and AP "Specific Application Sprinklers for Protecting Attics", Tyco Fire & Building Products, Peak Performance, TFP610, 28 pages, Aug. 2007.

Int'l Preliminary Report on Patentability dated Aug. 18, 2020 in Int'l Application No. PCT/US2019/017028.

"Horizontal Sidewall Sprinkler in Lintels and Soffits", Minnesota Public Safety State Fir Marshal, Quick Response, Nov. 2012.

Reliable Sprinkler, Models DD56-6, DD56-27, DD80-6, DD80-27, D556, GP56, AH42, & AH56 Sprinklers: Specific Application Sprinklers for Attic Spaces, Bulletin 056 May 2019, www.reliablesprinkler.com, 26 pages.

Viking Group Inc., Model V-BB Specific Application Attic Sprinkler, Technical Data, Form No. F_042915. Rev. 162, p. 65, 15 pages, Oct. 25, 2018.

Office Action dated Feb. 2, 2022 in Australian Application No. 202087113.

Office Action dated Mar. 8, 2022 in Indian Application No. 202017033045.

Written Opinion dated Feb. 24, 2022 in Singapore Application No. 11202112998S.

Office Action dated Mar. 23, 2022 in Chinese Application No. 201980013663 (Shown for relavance, no translation provided).

Woojingak (meeting) roof 3. Naver Blog, [online], Jul. 2021, [Search May 25, 2022], Internet:<URL:http://m.blog.naver.com/kenag/222427997309 (no translation available).

Office Action dated May 31, 2022 in Korean Application No. 10-2022-7000204.

Office Action dated Jan. 16, 2023 in SA Application No. 520412632.

Office Action dated Jun. 20, 2020 in Chinese Application No. 201980013663.8.

Office Action dated Dec. 19, 2022 in U.S. Appl. No. 16/337,763.

Office Action dated Jan. 12, 2022 in U.S. Appl. No. 16/337,763.

Wilkins, Roger; The Use of Specific Application Sprinklers for Protecting Attics, Tyco Fire and Building Products (Year: 2007).

FIRE PROTECTION SYSTEM FOR SLOPED COMBUSTIBLE CONCEALED SPACES HAVING HIPS

CROSS-REFERENCE TO RELATED APPLICATIONS

This application is a continuation of similarly-titled U.S. patent application Ser. No. 17/616,863, filed Dec. 6, 2021, which is a Section 371 of International Application No. PCT/US20/36115, filed Jun. 4, 2020, which was published on Dec. 10, 2020, under International Publication No. WO 2020/247624 A1, which claims priority from U.S. Provisional Patent Application No. 62/858,427, titled "Fire Protection System for Sloped Combustible Concealed Spaces Having Hips", filed on Jun. 7, 2019, the entire contents of which are incorporated by reference herein.

BACKGROUND OF THE DISCLOSURE

The present disclosure relates generally to fire protection, and, more particularly, to fire protection systems for use in attics and combustible concealed spaces beneath pitched roofs, particularly, those having hips.

Fire sprinkler systems, and the installation and operation thereof, are subject to nationally recognized codes and standards, such as NFPA 13, 13D and 13R, which are incorporated by reference herein. NFPA 13 and other standards require the use of equipment and components that have been independently tested by a recognized laboratory (e.g. UL or FM) to identify and verify their physical characteristics and performance.

An attic is the normally unoccupied, combustible concealed space between the ceiling of the uppermost occupied floor of a building and the pitched roof of the space. A particular problem arises with respect to fire protection in attics of buildings where the roof structures are pitched and are constructed of wooden joists and rafters or wooden trusses (hereinafter "structural members"); examples are shown in FIGS. 1A and 1B. Namely, sprinkler selection and positioning options in an attic space thus far suffer from delayed activation and inefficient and exorbitant water consumption.

The problem becomes more complicated when considering a pitched roof having "hips," an example of which is shown in FIG. 1B. An example of a structure of a hip is shown in FIG. 2. Due to the types and arrangement of structural members in such a hip, heat may spread in a more complex manner than in a pitched roof without hips (or in the pitched (gable) portion of a roof with hips).

It may, therefore, be desirable to provide fire protection systems in hip areas of a roof so as to provide sprinklers within the hip areas in such a way that the sprinklers are well-positioned in relation to the fire origin location, that can provide quick response times, and that have spray distribution suited for placement near common attic hip structural members, thereby accomplishing more efficient fire control.

BRIEF SUMMARY OF THE DISCLOSURE

Briefly stated, one aspect of the present disclosure may be directed to a fire protection system for a hip area of a combustible concealed space. The fire protection system may comprise sprinklers arranged in rows, in a direction perpendicular to the slope of the hip. The spacing of the sprinklers within a row may have a greater maximum separation distance than a maximum separation distance between rows, in a direction parallel to the slope of the hip (i.e., with respect to a horizontal direction, e.g., of a bottom of the attic).

According to a further aspect of the present disclosure, a method of laying out sprinkler heads in a hip portion of a roof may involve spacing sprinklers within rows at a maximum separation distance greater than a maximum separation distance between adjacent rows in a direction parallel to the slope of the hip.

BRIEF DESCRIPTION OF THE DRAWINGS

The following description of preferred embodiments of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Figure 1A:
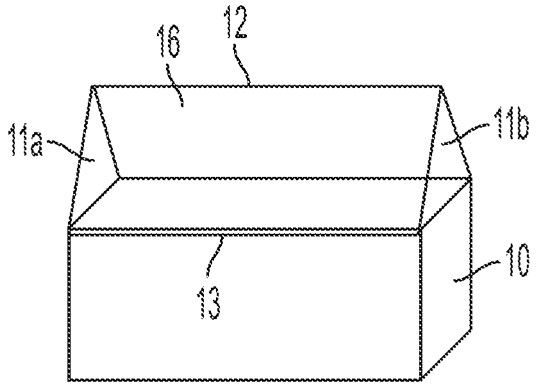
FIGS. 1A and 1B shows illustrative examples of structures having roofs without and with hips, respectively, according to aspects of the present disclosure.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of an attic space or a sprinkler, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, FIGS. 1A-6B generally show a sprinkler system for an attic or a combustible concealed space with a pitched roof having hip sections, according to various aspects of the present disclosure. A building or other structure 10 may have an attic or other concealed space 16 (to be referred to hereinafter as an "attic"). As show in FIG. 1A, an attic 16 may generally be enclosed from above by a sloped or pitched roof ("pitched roof" will be used hereinafter) having opposingly-disposed sloped sides extending downward and outward from a ridgeline 12 to respective eaves 13. The sides may be constructed from wooden joists and rafters or wooden trusses (which will, in the aggregate, be referred to hereinafter as "structural members"). Eaves 13 may coincide with a horizontal floor of the attic 16 or extend beyond the ends of the horizontal floor of the attic 16. The spacing between adjacent parallel structural members defines a respective channel. Generally, a channel may, for example, be between approximately three (3) inches and six (6) inches deep, but could also be greater. Also in the example of FIG. 1A, the attic 16 may be enclosed by side panels 11*a* and 11*b*.

Figure 1B:
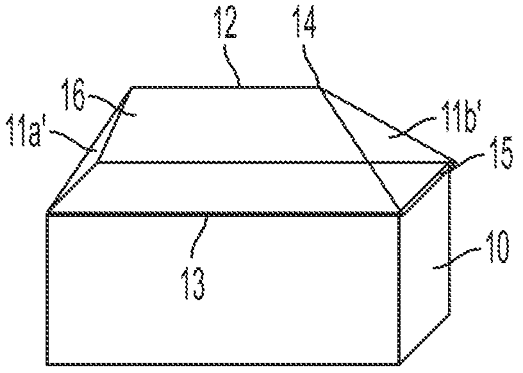

FIG. 1B shows an example of a structure 10 having an attic 16 enclosed by a roof having a pitched portion and hips 11*a*', 11*b*' at the ends, instead of side panels 11*a*, 11*b*. Each of hips 11*a*', 11*b*' is enclosed by a panel that may extend from an end 14 of ridgeline 12 (end 14 of ridgeline 12 may similarly be referred to as "the apex of the hip"), downwardly and outwardly, ending in respective eaves (e.g., eaves 15), which may coincide with or extend beyond an end of a horizontal floor of attic 16. The sides of the panels of the hips 11*a*', 11*b*' may abut ends of the respective downward-sloping sides of the pitched portion of the roof.

Figure 2:
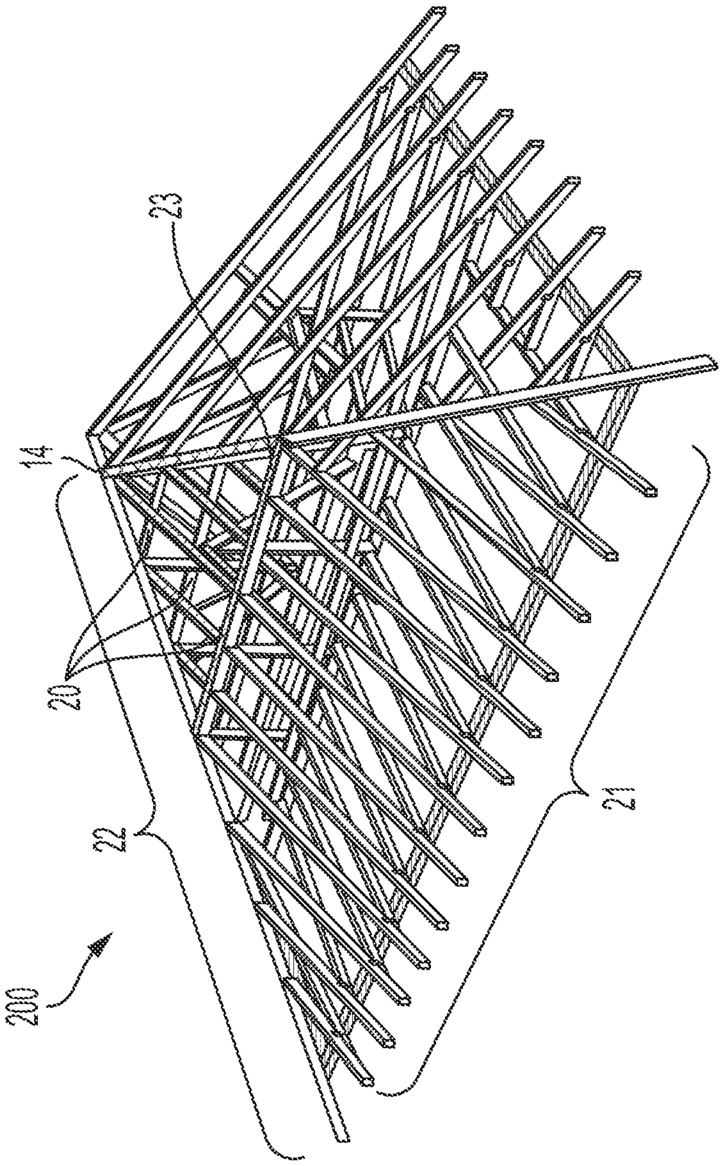
FIG. 2 shows an illustrative example of a hip portion of a roof, according to aspects of the present disclosure.

FIG. 2 shows an illustrative example of a support structure 200 of hip 11*a*', 11*b*' of a hipped roof, according to various aspects of the present disclosure. As noted above, the external portion of the structure (facing upward and outward) may extend downward and outward from an end 14 of ridgeline 12 (not shown).

Figure 3:
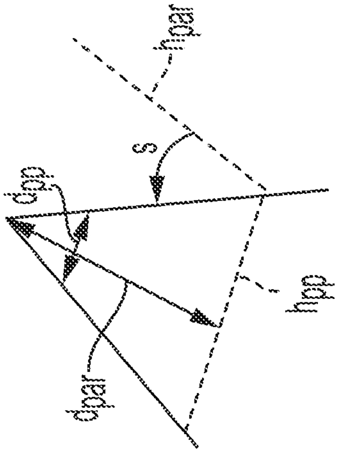
FIG. 3 shows a diagram explaining different orientations, as may be referred to in aspects of the present disclosure.

Before continuing to describe the support structure 200, it is useful to discuss a frame of reference, for descriptive purposes, only. FIG. 3 shows a hip (not labeled). The hip, shown in solid lines, may be sloped at some angle s with respect to a horizontal floor (or other horizontal frame of reference) of the attic 16, shown in dotted lines. Turning first to the hip (or outer panel thereof), two directions may be defined: (a) $d_{par}$, a direction parallel to the slope of the hip; and (b) $d_{pp}$, a direction perpendicular to the slope of the hip. In other words, $d_{par}$ corresponds to a direction at an upward slope s with respect to a parallel direction $h_{par}$ along the horizontal floor, while $d_{pp}$ corresponds to a direction that is perpendicular to $d_{par}$, and which parallels, in a vertical projection onto the attic floor, a direction $h_{pp}$ perpendicular to $h_{par}$.

Returning to FIG. 2, a typical hip support structure 200 may be composed of two types of trusses: jack trusses 21 and stepdown trusses 20; it is noted that equivalent structures may be built of joists and rafters (not shown). Stepdown trusses 20 may include generally horizontal pieces that are spaced apart between the end 14 of the ridgeline to a further generally horizontal structural member 23 disposed at a predefined location downslope of end 14 of the ridgeline, where structural members 20 and 23 are in a direction perpendicular to the slope of the hip. The number of stepdown trusses 20 employed may depend upon the size of the hip 11*a*', 11*b*', where a larger number of stepdown trusses 20 may be used for larger hips. Jack trusses 21, on the other hand, may include pieces that are generally parallel to the slope of the hip. In general, jack trusses 21 may extend four to fifteen feet from the eaves, again, oriented in a direction generally parallel to the slope of the hip 11*a*', 11*b*', but the jack truss 21 lengths are not thus limited.

In the foregoing, reference numeral 22 will be used to denote the outer-facing structure of hip support structure 200, including the structural members 20, 21 and 23; for convenience, the reference numerals 20 and 21, while stated above as corresponding to trusses, will be used, interchangeably, to refer to the outer facing structural pieces of the trusses that are disposed in perpendicular and parallel directions, respectively, with respect to the slope of the hip, as well as to the regions of the hip structure that contain them. The region containing the stepdown trusses 20 may also be referred to as the "upper hip," while the region containing the jack trusses 21 may also be referred to as the "lower hip."

Figure 4A:
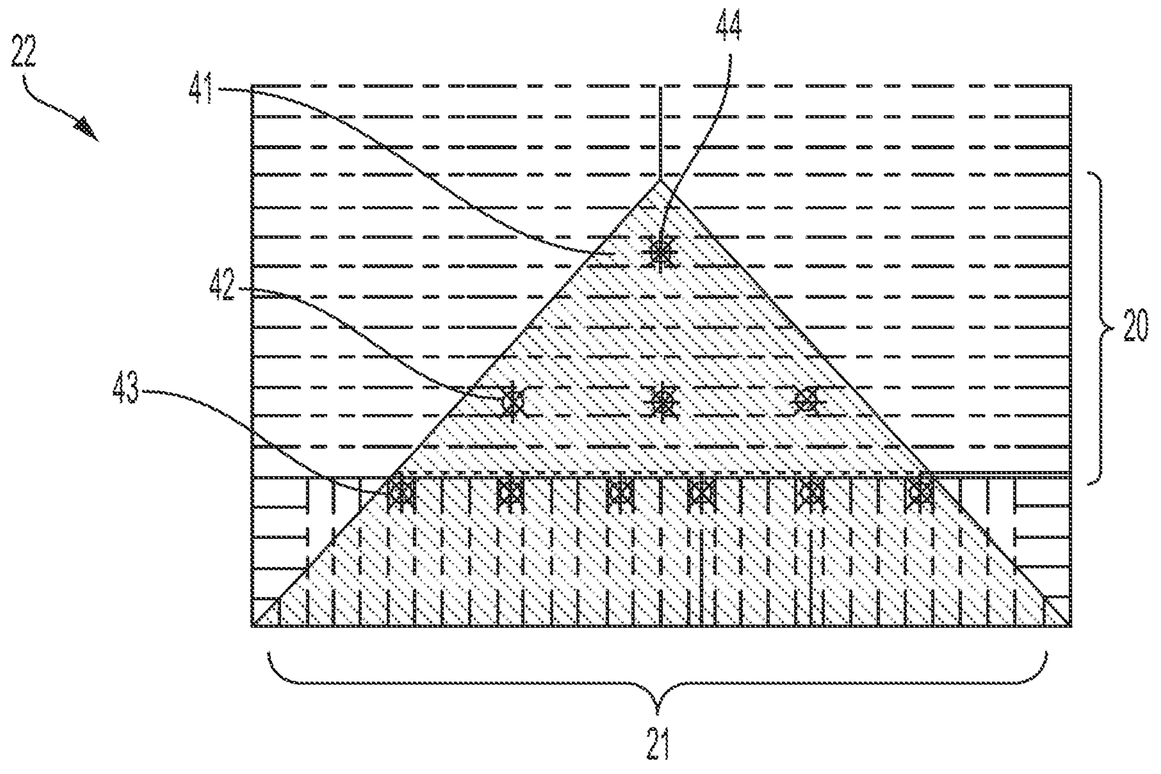
FIGS. 4A and 4B show conceptual depictions of projections of a hip structure onto horizontal surfaces, according to aspects of the present disclosure.
Figure 4B:
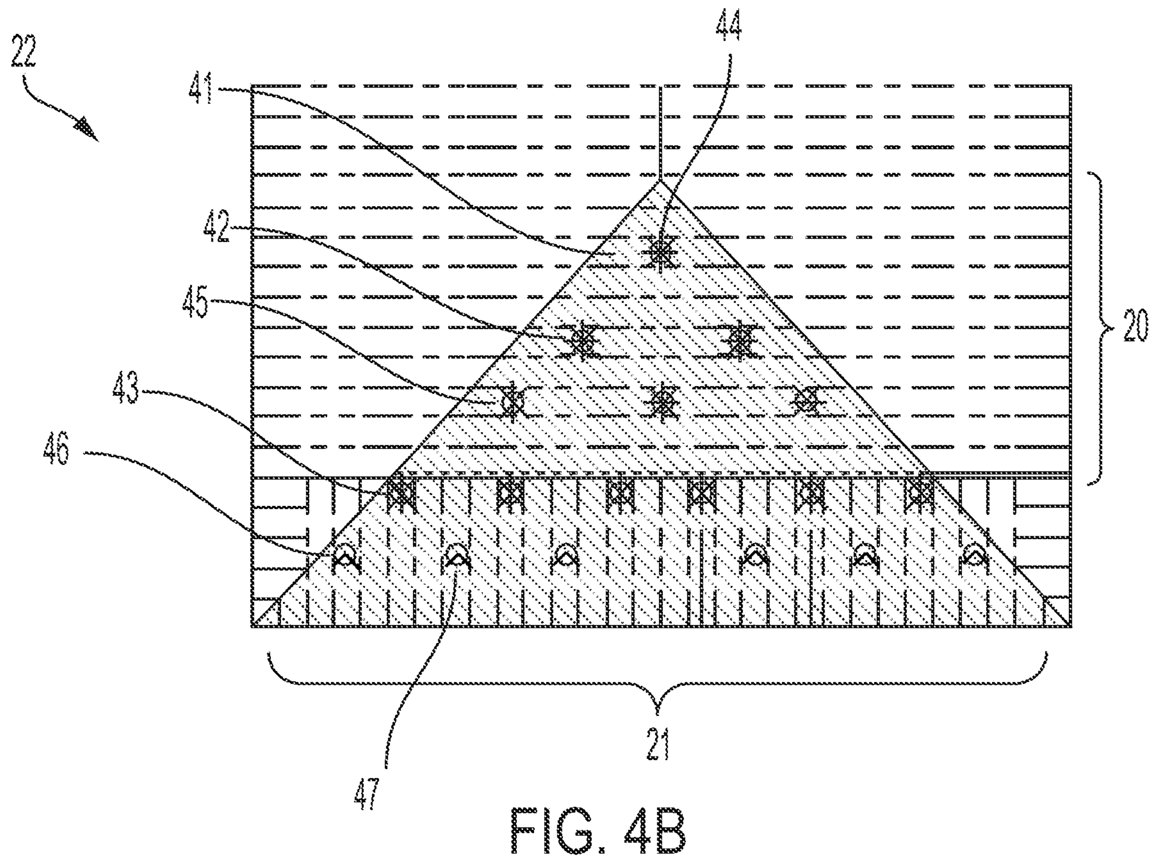
Figure 5B:
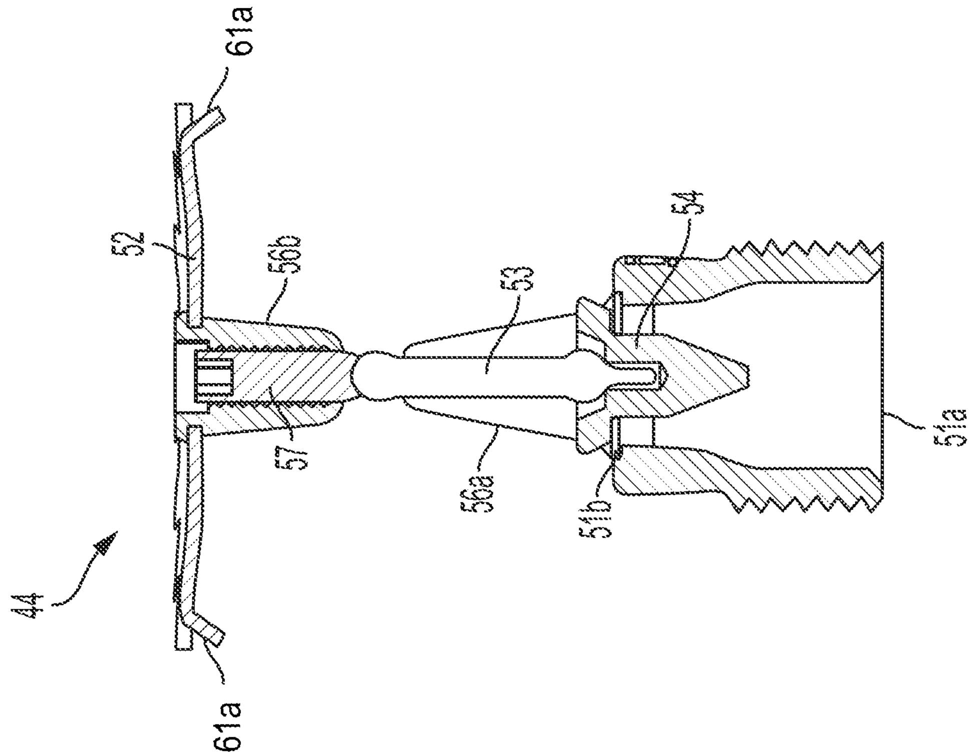
FIGS. 5A and 5B and 6A and 6B show conceptual diagrams of sprinklers that may be used according to various aspects of the present disclosure.
Figure 5A:
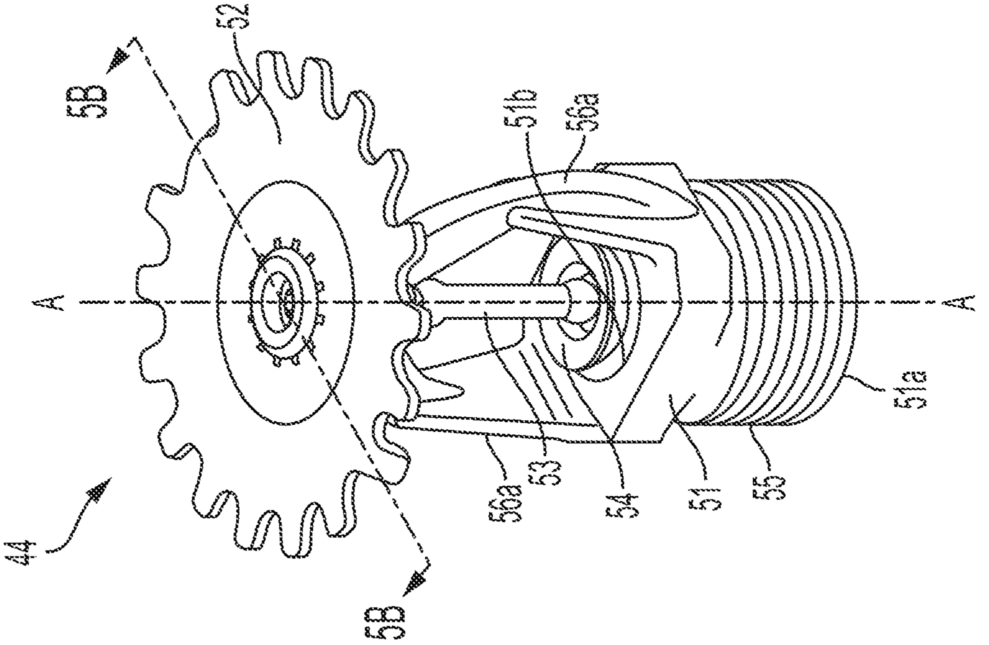

FIGS. 4A and 4B show illustrative examples of a hip structure 22, equipped with sprinkler systems, according to various aspects of the present disclosure. The examples of FIGS. 4A and 4B are shown flat, where the direction of the slope is between the top and the bottom (in other words, as if the hip structures were laid flat upon or projected onto a horizontal surface). According to another way of stating this, $d_{par}$ extends in a vertical (or "north-south") direction on the page, while $d_{pp}$ extends in a horizontal (or "east-west") direction on the page.

Referring first to FIG. 4A, a sprinkler system may include omnidirectional sprinklers 44 arranged in rows 41, 42, 43 perpendicular to the slope of the hip (and thus parallel to one another). The omnidirectional sprinklers 44 may be Model GL-SS/RE GL5620, manufactured by Globe Fire Sprinkler Corporation ("Globe") and described, for example, in Globe Publication GFS-650, "Specific Application Attic Sprinklers," available at www.globesprinkler.com, and incorporated herein by reference. Note, however, that the disclosure is not limited to the use of this specific omnidirectional sprinkler, and other types may be used. Rows 41 and 42 may be arranged in a stepdown portion 20 of structure 22, while row 43 may be arranged in a jack truss region 21 of structure 22. Row 41, which may include a single sprinkler 44, but is not thus limited, may be located substantially at the apex 14 of the hip 11*a*', 11*b*', and row 42 may be located downslope from row 41. In general, the sprinklers 44 may be disposed within channels formed by areas between trusses; but the disclosure is not thus limited. As noted above, the stepdown portion 20 and the jack truss portion 21 may be separated by a horizontal structure member 23, as shown in FIG. 2 (but not shown in the present drawing). FIG. 4B shows the stepdown portion 20 of structure 22 including a third row 45 of sprinklers 44 and the jack truss region 21 of structure 22 including a second row 46 of sprinklers 47. It is noted that, while only three rows of sprinklers 41, 42, 45 are shown in the stepdown portion 20 in FIG. 4B and only two rows of sprinklers 43, 46 are shown in the jack truss region 21 in FIG. 4B, more rows may be present, in the upper hip 20, in the lower hip 21, or both. This may be dependent, for example, upon the spray patterns/distances of the sprinklers used.

Additionally, it is noted that a row of directional sprinklers 47 (as schematically shown in FIG. 4B), with spray patterns directed downslope (i.e., toward the eave), may be employed as a bottom row, e.g., row 46, within the jack truss portion 21, as a further row, downslope of row 43. This may be used, in particular, if a distance to which a given omnidirectional sprinkler 44 is less than the length of one or more of the jack trusses 21. An example of such a directional sprinkler is Model GL-SS/DS GL5621, manufactured by Globe, and described, e.g., in Globe datasheet, "Specific Application Attic Sprinklers," available at www.globesprinkler.com, and incorporated by reference herein. However, this is merely an example, and the disclosure is not limited to this particular sprinkler.

As a particular example, to which the disclosure is not limited, the maximum length of jack trusses 21 in the lower hip may be sixteen feet, and the maximum spread of an omnidirectional sprinkler 44 in row 43 may only be twelve feet. In such a case, a further row, e.g., row 46, of directional sprinklers 47, as discussed above, may be placed such that the direction sprinklers spray in a downslope direction and are sufficient to cover the area of the lower hip not covered by the spray of the omnidirectional sprinklers 44 of row 43.

Within the upper hip 20, as heat rises up the hip 11*a*', 11*b*', the progression of the heat in a generally upward direction, along the slope of the hip 11*a*', 11*b*' may be slowed by the structure of the stepdown trusses 20. Due to this structure, heat may roll under the stepdown trusses 20, which are perpendicular to the direction of the slope of the hip, and after rolling under a given stepdown truss 20, may spread horizontally, prior to rolling under a further stepdown truss 20. This may suggest a particular arrangement of sprinklers 44 in the upper hip 20, in which a maximum spacing between sprinklers 44 in a direction perpendicular to the slope of the hip is greater than a maximum spacing of sprinklers 44 in a direction parallel to the slope of the hip. In an illustrative example, maximum spacing in the perpendicular direction may be up to twelve feet between sprinklers, while maximum spacing in the parallel direction may be up to ten feet between sprinklers (i.e., rows of sprinklers). Note that this is merely an example, and the disclosure is not thusly limited.

FIGS. 5A-6B illustrate an example of an omnidirectional sprinkler 44 that may be used, and which may correspond to Globe Model GL-22/RE GL5620; but it is understood, once again, that the disclosure is not limited to any particular omnidirectional sprinkler. In one non-limiting example, the sprinkler 44 may be mounted to project upwardly from a water branch line (either perpendicularly to the branch line, or at an upward angle relative thereto). The sprinkler 44 may include a sprinkler frame 51, a fluid deflector 52, and a thermal trigger (i.e., heat-sensitive element) 53 supporting a seal assembly/plug 54 to seal the sprinkler 44 in an unactuated configuration. The sprinkler frame 51 may define a proximal inlet 51*a*, a distal outlet 51*b*, and an internal water passageway extending therebetween which defines a sprinkler axis A-A. In the illustrated example, the thermal trigger 53 may take the form of a glass-bulb type trigger disposed and axially aligned along the sprinkler axis A-A, but the disclosure is not so limited.

The sprinkler frame 51 may include an at least partially externally threaded body 55, defining the proximal inlet 51*a*, the distal outlet 51*b* and the internal water passageway extending therethrough, which may receive at least a portion of the sealing plug 54. The body 55 may be mounted, e.g., threadingly, to a water line branch (not shown) to receive water therefrom and through the internal water passageway through the body 55. Two frame arms 56*a* may be radially positioned or diametrically opposed about the body 55 and may extend axially therefrom toward the deflector 52. The frame arms 56*a* may converge toward the sprinkler axis A-A to terminate at a terminal end 56*b* of the sprinkler frame 51 axially aligned along the sprinkler axis A-A. The deflector 52 may be mounted upon the terminal end 56*b* of the sprinkler frame 51.

A compression screw 57 (shown in FIG. 5B), or the like, may be used to secure the thermal trigger 53 upon the sealing plug 54, in a manner well understood by those of ordinary skill in the art. The thermal trigger 53, via the compression screw 57, may apply pressure to the sealing plug 54 (greater than the opposing water pressure on the sealing plug 54 from the fluid in the branch line) to prevent water (from the branch line) from flowing out of the body 55 until the ambient temperature around the sprinkler 44 reaches the activation temperature, at which time the thermal trigger 53 is triggered/activated. Upon activation of the thermal trigger 53, e.g., shattering of the glass bulb, the sealing plug 54 may be forced out by the upstream pressurized water and deflected away. The water may spray out from the water passageway in the body 55 and may impact upon the deflector 52 for distribution thereof in a desired spray pattern according to the design of the deflector 52.

Figure 6A:
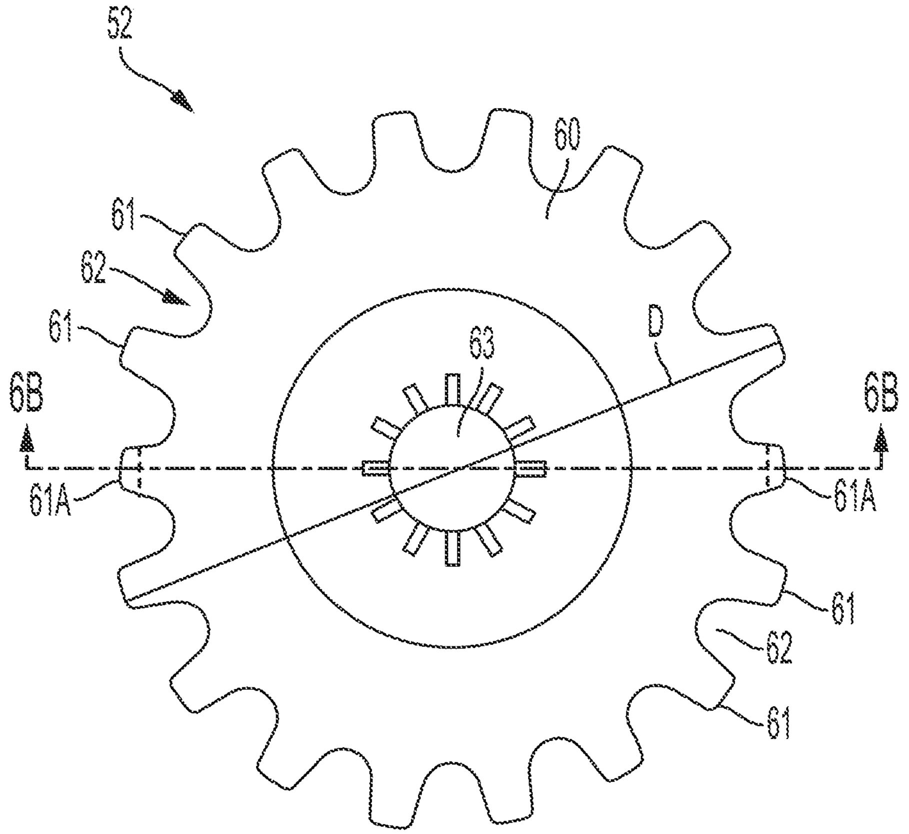
Figure 6B:
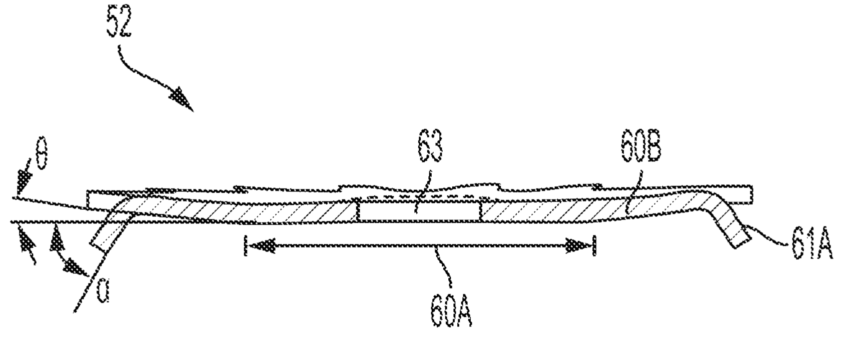

Turning to FIGS. 6A-6B, the deflector 52, in the illustrated example, may be designed for spray distribution in a generally elliptical pattern, such as, for example, a circular pattern. In one non-limiting example, the pressurized water may be projected by the deflector 52 up to approximately twenty-four (24) feet in diameter, i.e., twelve (12) feet in every direction, resulting in a twelve-foot omnidirectional spray pattern. As shown in FIG. 6A, the deflector 52 may include a generally circular body 60 defining a diameter D. The deflector 52 may include a generally circular, generally flat, mounting aperture 63, for mounting to the terminal end 56*b* of the sprinkler frame 51. The deflector 52 may include a plurality of angularly spaced tines 61 about the periphery thereof, which may define a plurality of slots 62 therebetween. In the illustrated example, the deflector 52 may include eighteen (18) substantially equally dimensioned and substantially equally spaced tines 61, and eighteen (18) substantially equally dimensioned and substantially equally spaced slots 62, but the disclosure is not so limited.

As shown best in FIG. 6B, the body 60 of the deflector 52 may include a radially inner portion 60A, defining the mounting aperture 63 therein, and a concentric radially outer portion 60B integral with the inner portion 60A. As shown, the radially outer portion 60B may be angled upwardly, i.e., away from the sprinkler frame 51, by an angle $\Theta$ relative to the radially inner portion 60A. In one non-limiting example, the angle $\Theta$ may be approximately 5°, resulting in a high, top projection angle of water. Stated differently, in addition to conventional water distribution at substantially all downward angles below the deflector 52, the upward projection angle $\Theta$ may enable the water spray pattern to have a high projection, lofting the water spray closer to the attic structure above the sprinkler 44.

As also shown best in FIG. 6B, at least one pair of diametrically opposed tines 61A of the tines 61 of the deflector 52 may be angled downwardly, i.e., toward the sprinkler frame 51, by an angle $\alpha$ relative to the radially inner portion 60A of the body 60. In one non-limiting example, the angle $\alpha$ may be approximately 60°. The sprinkler 44 may be mounted to a water branch line such that the tines 61A are oriented substantially transverse to the branch line. Accordingly, water sprayed by one sprinkler 44 in a direction substantially transverse to the branch line may be deflected away from sprinklers in an adjacent branch line after contacting the tines 61A.

It will be appreciated by those skilled in the art that changes could be made to the various aspects of the disclosure described above without departing from the broad inventive concept of this application. It is understood, therefore, that the disclosure is not limited to the particular aspects of the present disclosure, but it is intended to cover modifications within the spirit and scope of the present disclosure, as set forth in the appended claims.

What is claimed is:

1. A fire protection system for a combustible concealed space, wherein the combustible concealed space comprises a roof having a generally pitched roof section and a hip at one end of the generally pitched roof section, wherein the hip has an apex that substantially coincides with an end of a ridgeline of the generally pitched roof section, and from which the hip spreads downwardly and outwardly toward sides of the pitched roof section and toward an eave, forming an angle with a generally horizontal floor of the combustible concealed space, the angle being the slope of the hip, the hip comprising an upper hip comprised of at least two stepdown trusses, disposed in a direction perpendicular to the slope of the hip and spaced in a direction parallel to the slope of the hip, and a lower hip comprised of a multiplicity of jack trusses, disposed in a direction parallel to the slope of the hip and spaced in a direction perpendicular to the slope of the hip, the fire protection system including:

an upper hip fire protection system, comprising:

a first row of sprinklers comprising at least one sprinkler, disposed substantially at the apex of the hip, wherein, in a case in which the first row of sprinklers contains two or more sprinklers, the two or more sprinklers are spaced apart from each other in the direction perpendicular to the slope of the hip;

a second row of sprinklers comprising at least two sprinklers, disposed at a first spacing downslope from the first row of sprinklers, in the direction parallel to the slope of the hip, wherein the at least two sprinklers are spaced apart from each other in the direction perpendicular to the slope of the hip; and a third row of sprinklers comprising at least two sprinklers, disposed at a second spacing downslope from the second row of sprinklers, wherein the at least two sprinklers of the third row of sprinklers are spaced apart from each other in the direction perpendicular to the slope of the hip;

wherein a maximum spacing between any two of the at least two sprinklers in the second row of sprinklers is greater than a maximum value for the first spacing and a maximum spacing between any two of the sprinklers in the second row of sprinklers and a maximum spacing between any two of the sprinklers in the third row of sprinklers is greater than a maximum spacing value for the first spacing and for the second spacing.

2. The fire protection system of claim 1, wherein the maximum spacing value for the first and second spacings is at most ten (10) feet.

3. A fire protection system for a combustible concealed space, wherein the combustible concealed space comprises a roof having a generally pitched roof section and a hip at one end of the generally pitched roof section, wherein the hip has an apex that substantially coincides with an end of a ridgeline of the generally pitched roof section, and from which the hip spreads downwardly and outwardly toward sides of the pitched roof section and toward an eave, forming an angle with a generally horizontal floor of the combustible concealed space, the angle being the slope of the hip, the hip comprising an upper hip comprised of at least two stepdown trusses, disposed in a direction perpendicular to the slope of the hip and spaced in a direction parallel to the slope of the hip, and a lower hip comprised of a multiplicity of jack trusses, disposed in a direction parallel to the slope of the hip and spaced in a direction perpendicular to the slope of the hip, the fire protection system including:

an upper hip fire protection system, comprising:

a first row of sprinklers comprising at least one sprinkler, disposed substantially at the apex of the hip, wherein, in a case in which the first row of sprinklers contains two or more sprinklers, the two or more sprinklers are spaced apart from each other in the direction perpendicular to the slope of the hip; and a second row of sprinklers comprising at least two sprinklers, disposed at a first spacing downslope from the first row of sprinklers, in the direction parallel to the slope of the hip, wherein the at least two sprinklers are spaced apart from each other in the direction perpendicular to the slope of the hip;

wherein a maximum spacing between any two of the at least two sprinklers in the second row of sprinklers is greater than a maximum value for the first spacing; and a lower hip fire protection system, comprising:

a first row of two or more first lower sprinklers disposed between the jack trusses and spaced apart from each other in the direction perpendicular to the slope of the hip; and a second row of two or more second lower sprinklers disposed between the jack trusses and spaced apart from each other in the direction perpendicular to the slope of the hip.

4. The fire protection system of claim 3, wherein the first lower sprinklers are substantially omnidirectional sprinklers and the second lower sprinklers are directional sprinklers having respective spray patterns that are directed generally downslope with respect to the slope of the hip.

5. A method of positioning fire protection sprinklers in a combustible concealed space, wherein the combustible concealed space comprises a roof having a generally pitched roof section and a hip at one end of the generally pitched roof section, wherein the hip has an apex that substantially coincides with an end of a ridgeline of the generally pitched roof section, and from which the hip spreads downwardly and outwardly toward sides of the pitched roof section and toward an eave, forming an angle with a generally horizontal floor of the combustible concealed space, the angle being the slope of the hip, the hip comprising an upper hip comprised of at least two stepdown trusses, disposed in a direction perpendicular to the slope of the hip and spaced in a direction parallel to the slope of the hip, and a lower hip comprised of a multiplicity of jack trusses, disposed in a direction parallel to the slope of the hip and spaced in a direction perpendicular to the slope of the hip, the method including:

positioning sprinklers in three or more rows in the upper hip, comprising:

positioning a first row of sprinklers comprising at least one sprinkler, substantially at the apex of the hip, wherein, in a case in which the first row of sprinklers contains two or more sprinklers, the positioning the first row of sprinklers includes spacing the two or more sprinklers apart from each other in the direction perpendicular to the slope of the hip;

positioning a second row of sprinklers comprising at least two sprinklers, at a first spacing downslope from the first row of sprinklers, in the direction parallel to the slope of the hip, including spacing the at least two sprinklers apart from each other in the direction perpendicular to the slope of the hip; and positioning a third row of sprinklers comprising at least two sprinklers, at a second spacing downslope from the second row of sprinklers, including spacing the at least two sprinklers of the third row of sprinklers apart from each other in the direction perpendicular to the slope of the hip, wherein a maximum spacing between any two of the at least two sprinklers in the second row of sprinklers is greater than a maximum value for the first spacing and a maximum spacing between any two of the sprinklers in the second row of sprinklers and a maximum spacing between any two of the sprinklers in the third row of sprinklers is greater than a maximum spacing value for the first spacing and for the second spacing.

6. The method of claim 5, wherein the maximum spacing value for the first and second spacings is at most ten (10) feet.

7. A method of positioning fire protection sprinklers in a combustible concealed space, wherein the combustible concealed space comprises a roof having a generally pitched roof section and a hip at one end of the generally pitched roof section, wherein the hip has an apex that substantially coincides with an end of a ridgeline of the generally pitched roof section, and from which the hip spreads downwardly and outwardly toward sides of the pitched roof section and toward an eave, forming an angle with a generally horizontal floor of the combustible concealed space, the angle being the slope of the hip, the hip comprising an upper hip comprised of at least two stepdown trusses, disposed in a direction perpendicular to the slope of the hip and spaced in a direction parallel to the slope of the hip, and a lower hip comprised of a multiplicity of jack trusses, disposed in a direction parallel to the slope of the hip and spaced in a direction perpendicular to the slope of the hip, the method including:

positioning sprinklers in two or more rows in the upper hip, comprising:

positioning a first row of sprinklers comprising at least one sprinkler, substantially at the apex of the hip, wherein, in a case in which the first row of sprinklers contains two or more sprinklers, the positioning the first row of sprinklers includes spacing the two or more sprinklers apart from each other in the direction perpendicular to the slope of the hip; and positioning a second row of sprinklers comprising at least two sprinklers, at a first spacing downslope from the first row of sprinklers, in the direction parallel to the slope of the hip, including spacing the at least two sprinklers apart from each other in the direction perpendicular to the slope of the hip;

wherein a maximum spacing between any two of the at least two sprinklers in the second row of sprinklers is greater than a maximum value for the first spacing; and positioning sprinklers in two or more rows in the lower hip, comprising positioning a first row of two or more first lower sprinklers between the jack trusses and spaced apart from each other in the direction perpendicular to the slope of the hip; and positioning a second row of two or more second lower sprinklers in the lower hip between the jack trusses and spaced apart from each other in the direction perpendicular to the slope of the hip.

8. The method of claim 7, wherein the first lower sprinklers are substantially omnidirectional sprinklers and the second lower sprinklers are directional sprinklers having respective spray patterns that are directed generally downslope with respect to the slope of the hip.

* * * * *